United States Patent
Morcom

(10) Patent No.: US 6,647,499 B1
(45) Date of Patent: Nov. 11, 2003

(54) SYSTEM FOR POWERING DOWN A DISK STORAGE DEVICE TO AN IDLE STATE UPON TRNSFER TO AN INTERMEDIATE STORAGE LOCATION ACCESSIBLE BY SYSTEM PROCESSOR

(75) Inventor: Daniel Joseph Morcom, Pine Island, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/491,878

(22) Filed: Jan. 26, 2000

(51) Int. Cl.[7] .............................. G06F 1/26; G06F 12/00
(52) U.S. Cl. ...................... 713/300; 711/100; 711/111
(58) Field of Search ......................... 713/300; 711/100, 711/111, 112

(56) References Cited

U.S. PATENT DOCUMENTS

| | | |
|---|---|---|
| 5,493,670 A | 2/1996 | Douglis et al. |
| 5,548,763 A | 8/1996 | Combs et al. |
| 5,625,615 A | 4/1997 | Dente et al. |
| 5,761,735 A | 6/1998 | Huon et al. .................. 711/167 |
| 5,822,288 A * | 10/1998 | Shinada ................... 369/47.33 |
| 5,845,291 A | 12/1998 | Winokur |
| 5,937,433 A | 8/1999 | Lee et al. |
| 6,147,618 A * | 11/2000 | Halleck et al. .............. 340/539 |
| 6,332,175 B1 * | 12/2001 | Birrell et al. ............ 369/30.23 |

FOREIGN PATENT DOCUMENTS

| | | | |
|---|---|---|---|
| EP | 0744697 A1 | 11/1996 | ........... G06F/13/12 |
| JP | 03-141030 | 6/1991 | |

* cited by examiner

Primary Examiner—Thomas Lee
Assistant Examiner—Suresh K Suryawanshi
(74) Attorney, Agent, or Firm—Dugan & Dugan, PC

(57) ABSTRACT

In a first aspect, a system is provided that includes a first device that can store data and transfer data. The first device is capable of transferring data at a first rate, although the first device may transfer data at other rates. An intermediate storage location is coupled to the first device, and a second device is coupled to the first device and to the intermediate storage location. The second device includes a processor that is adapted to execute a computer program that requires data to be transferred to the processor at a second rate which is lower than the first rate. Computer program code is provided that can initiate the transfer of data at the first rate from the first device to the intermediate storage location and that can initiate the transfer of data at the second rate from the intermediate storage location to the processor.

7 Claims, 5 Drawing Sheets

SYSTEM FOR POWERING DOWN A DISK STORAGE DEVICE TO AN IDLE STATE UPON TRNSFER TO AN INTERMEDIATE STORAGE LOCATION ACCESSIBLE BY SYSTEM PROCESSOR

FIELD OF THE INVENTION

The present invention relates generally to portable electronic devices, and more particularly to increasing the battery life of portable electronic devices.

BACKGROUND OF THE INVENTION

For a portable electronic device such as a personal data assistant (PDA), a digital audio player (e.g., an MPEG3 or "MP3" player), a digital video player (e.g., a DVD player) or the like to play digital audio or video, or to perform other data intensive operations, a continuous stream of data at rates of up to 1.5 Mbytes/min must be supplied to the portable electronic device. Due to limited internal memory capacity, portable electronic devices typically cannot store sufficient data to sustain continuous data intensive operations (e.g., the playing of digital audio or video) for any meaningful time period (e.g., long enough to play an entire song or video).

To compensate for limited internal memory capacity, most portable electronic devices employ removable storage devices to supply data to the portable, electronic devices. Common removable storage devices include removable disk drives, hard drives or compact flash™ memory devices. As used herein, removable storage devices include devices that may be external to or internal to a portable electronic device.

While removable storage devices contain sufficient memory and dan sustain most data rates required by portable electronic devices, these storage devices also consume significant electrical power and thereby severely reduce the battery life of portable electronic devices. For example, the battery life of a typical PDA running an MP3 player application is about 30–45 minutes if the PDA uses a removable storage device to continuously supply digitized audio data to the PDA. Such a short battery life renders the use of portable electronic devices that perform data intensive operations both expensive and inconvenient.

SUMMARY OF THE INVENTION

To address the needs of the prior art, systems, devices, computer program products, and methods are provided which significantly increase the battery life of a portable electronic device that performs data intensive operations such as playing digital audio or video. While particularly beneficial for increasing the battery life of the above described portable electronic devices, the present invention may be employed in other applications including portable DVD players, wearable computers and automobile personal computers.

In a first aspect of the invention, a system is provided that includes a first device that can store data and transfer data (e.g., a removable storage device such as a hard drive, a tape drive, a CD-ROM drive, a DVD drive or a flash memory device such as a compact flash™ memory device, a Smart Media™ or a Memory Stick™). The first device is capable of transferring data at a first rate. An intermediate storage location (e.g., a cache memory such as a first-in first-out buffer, a random access memory, a static memory or a dynamic memory) is coupled to the first device, and a second device (e.g., a portable electronic device such as a PDA, an MP3 player, a video player, etc.) is coupled both to the first device and to the intermediate storage location. The second device includes a processor that is adapted to execute a computer program that requires, data to be transferred to the processor at a second rate which is lower than the first rate.

Computer program code is provided that can initiate the transfer of data at the first rate from the first device to the intermediate storage location and that can initiate the transfer of data at the second rate from the intermediate storage location to the processor. The intermediate storage location preferably is selected to consume less power when powered on than the first device consumes when powered on. Computer program code preferably is provided to power down the first device following the transfer of data from the first device to the intermediate storage location. As used herein, "powered on" means being in an operational state that is suitable for data transfer (e.g., a state having a spinning hard disk or CD-ROM) and "powered down" means being in an operational state that reduces power consumption, such as a state with all power removed from the device or an idle state (e.g., a state having a stationary hard disk or CD-ROM).

In other aspects of the invention, devices, computer program products and methods are provided for use within (or for use independent from) the above described system. Each inventive computer program product is carried by a medium readable by a computer (e.g., a carrier wave signal, a floppy disc, a hard drive, a random access memory, etc.).

Other objects, features and advantages of the present invention will become more fully apparent from the following detailed description of the preferred embodiments, the appended claims and the accompanying drawings.

BRIEF DESCRIPTION OF THE PREFERRED EMBODIMENTS

The present invention is described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

The present invention takes advantage of two observations: (1) that many data intensive operations such as playing digital audio and/or video require sustained data transfer rates (e.g., about 1.5 Mbytes/min for MP3 audio) that are far less than the data transfer rates of many removable storage devices (e.g., about 2.5 Mbytes/sec for an IBM Microdrive Model No. DMDM-10340); and (2) that removable storage devices such as hard drives, disk drives, CD-ROM drives, tape drives, flash memory devices, etc., typically consume significantly more power than smaller, internal memories such as first-in first-out buffers, random access memory (REM), static memory or dynamic memory (e.g., about 270 mA for a removable IBM Microdrive versus 15 mA for an internal RAM). Power savings thereby may be realized by employing a low power, internal memory to continuously stream data at a relatively low transfer rate (e.g., about 1.5 Mbytes/min) to a portable electronic device, and by employing a high power, removable storage device to transfer data at a relatively high transfer rate (e.g., about 2.5 Mbytes/sec) to the internal memory only when the portable. electronic device has read out all (or nearly all of the data within the low power, internal memory. The internal memory thus serves as an intermediate storage location for the portable electronic device that "reads ahead" data from the removable storage device for use by the portable electronic device. The removable storage device preferably is powered down immediately after transferring data to the low power internal memory so as to maximize power savings. Due to the high transfer rates of removable storage devices, these devices need only be powered on for a short time period. For example, in about 2–3 seconds, an IBM Microdrive can power on, transfer about 1 minute's worth of digital audio data to a PDA's internal RAM, and power down.

During data intensive operations that require the use of a removable storage device, such as when a PDA runs an MP3player application, the present invention has been found to extend the battery life of a PDA by up to 10 hours from the conventional limit of 30–45 minutes. While particularly beneficial for increasing the battery life of PDAs and MP3players, the present invention may be employed in many other applications including portable DVD players, wearable computers and automobile personal computers.

Figure 1:
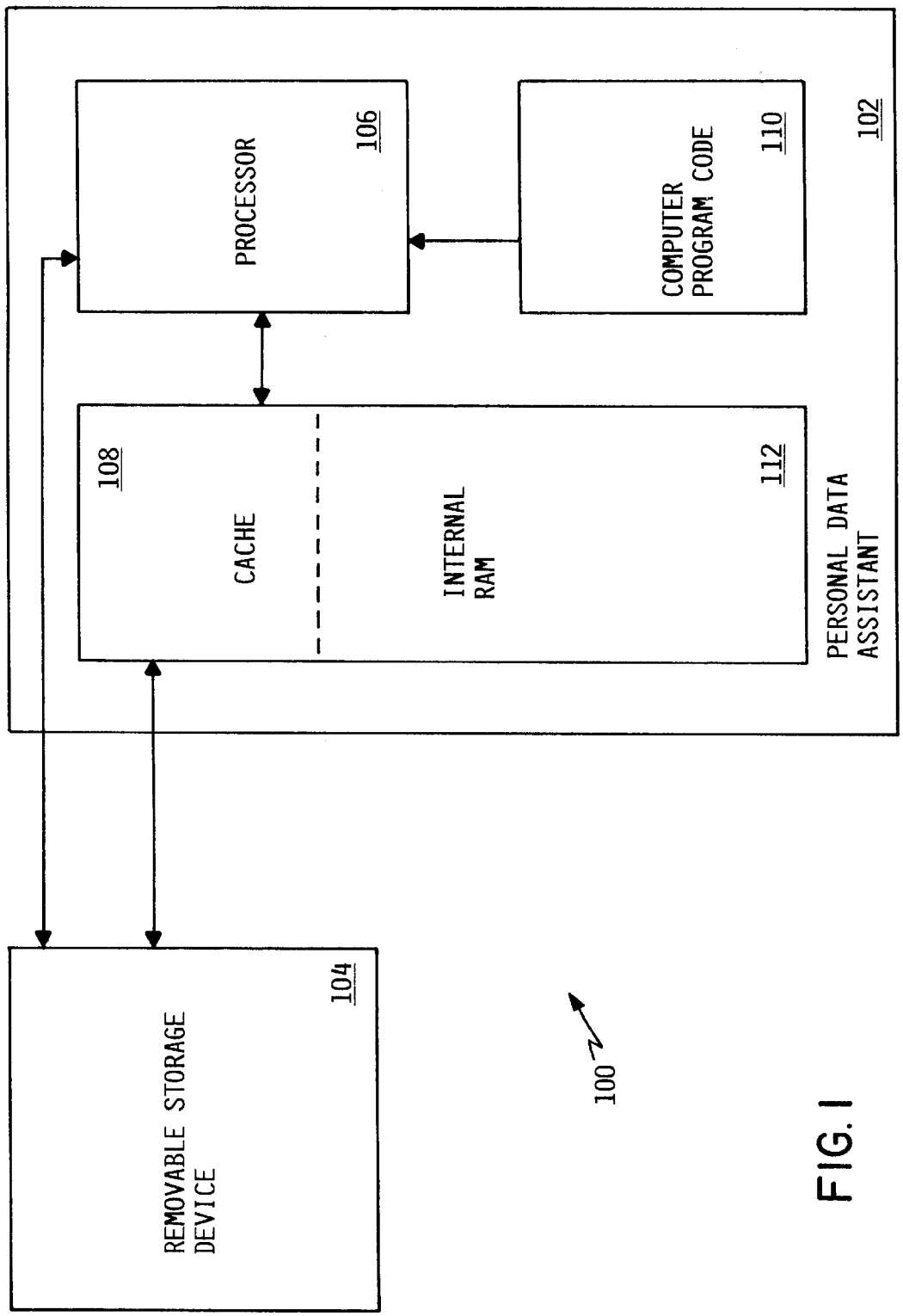
FIG. 1 is a schematic diagram of a first novel system for increasing the battery life of a portable electronic device such as a personal data assistant.

FIG. 1 is a schematic diagram of a first novel system 100 for increasing the battery life of a portable electronic device such as a personal data assistant (PDA) 102. The first system 100 comprises a removable storage device 104 coupled to the PDA 102. The removable storage device 104 is adapted to store data and to transfer data, and may comprise, for example, a hard drive, a personal computer, a tape drive, a CD-ROM drive, a DVD drive, a flash memory device such as a compact flash™ memory device, a Smart Media™ or a Memory Stick™, or any other conventional storage device.

The PDA 102 includes a processor 106 coupled to a cache memory 108, and computer program code 110 for controlling the operation of the processor 106. The processor 106 may comprise, for example, any conventional microprocessor. The cache memory 108 preferably comprises a portion of the PDA 102's internal random access memory (RAM) 112, but in general may comprise any other known memory device such as a first-in first-out buffer, a static memory, a dynamic memory, etc. To increase the battery life oft he PDA 102, the cache memory 108 should consume less power when powered on than the removable storage device 104 consumes when powered on.

The computer program code 110 includes program code that begins or otherwise "initiates" a plurality of events within the PDA 102 or the removable storage device 104. Events initiated by the computer program code 110 preferably include:
1. a transfer of data at a first rate from the removable storage device 104 to the cache memory 108;
2. a transfer of data at a second rate which is lower than the first rate from the cache memory 108 to the processor 106; and
3. powering down the removable storage device 104 following the transfer of data from the removable storage device 104 to the cache memory 108.

It will be understood that the computer program code 110 initiates an event by directing the processor 106 to initiate the event.

The computer program code 110 may be programmed using any programming language such as C, C++, Pascal or the like. Preferably the computer program code 110 resides within a device driver of the PDA 102. For example, if the PDA 102 employs the Microsoft Windows CE operating system, the computer program code 110 preferably resides within a device driver of the Microsoft™ Windows CE™ operating system.

As stated previously, the present invention increases the battery life of a portable electronic device (such as the PDA 102) by "reading ahead" data from the removable storage device 104 at a relatively high data transfer rate, by storing the read ahead data in an intermediate storage location (e.g., the cache memory 108) and by supplying data to the processor 106 from the cache memory 108 (at a relatively low transfer rate) rather than from the removable storage device 104. While the processor 106 accesses data stored within the cache memory 108, the removable storage device 104 is powered down until all (or nearly all) of the data stored within the cache memory 108 is read out by the processor 106. Thereafter, the removable storage device 104 is powered on only long enough to fill the cache memory 108 with new data, and the above process repeats. Because the removable storage device 104 consumes significantly more power than the cache memory 108 (e.g., about 270 mA for an IBM Microdrive versus 15 mA for an internal RAM), powering down the cache memory 108 can result in very large power savings. The battery life of the PDA 102 thereby is greatly extended.

Figure 2:
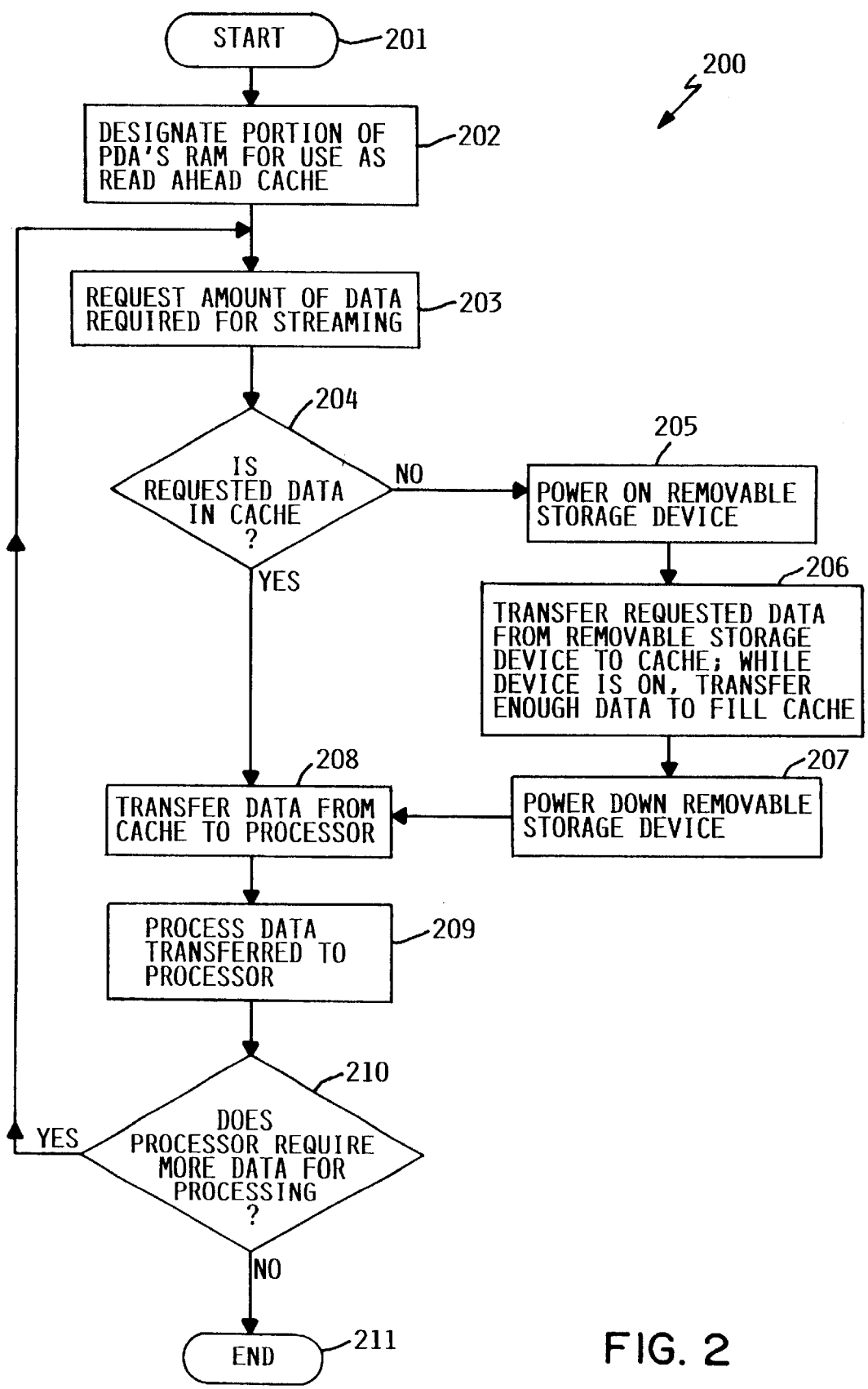
FIG. 2 is a flow chart of a preferred process for the first system of FIG. 1.

FIG. 2 is a flow chart or a preferred process 200 for the first system 100 of FIG. 1 that significantly increases the battery life of the PDA 102 during a data intensive operation. During the processor 106's execution of a computer program that performs data intensive operations such as playing digital audio or video, a continuous stream of data is required by the processor 106, at rates of up to about 1.5 Mbytes/min. The supplying of continuous data to the processor 106 is referred to herein as "data streaming".

With reference to FIG. 2, the process 200 begins with step 201 when the PDA 102 runs the computer program code 110. In step 202, the computer program code 110 designates a portion of the RAM 112 for use as the cache memory 108 (e.g., for use as a read ahead cache). The processor 106 then requests (step 203) an amount of data that is required by the PDA 102 for data streaming (e.g., to, play digital audio or video or to perform some other data intensive operation).

In step 204, the computer program code 110 determines if the requested data resides within the cache memory 108. If the requested data does not reside within the cache memory 108, the process 200 proceeds with steps 205–207; otherwise the process proceeds with step 208.

In step 205, the computer program code 110 powers on the removable storage device 104 (via a command sent from the processor 106 to the removable storage device 104), and the computer program code 110 then initiates the transfer of the requested data from the removable storage device 104 to the cache memory 108 (step 206). While the removable storage device 104 is powered on, enough data to fill the cache memory 108 is also transferred from the removable storage device 104 to the cache memory 108. Preferably all data transferred from the removable storage device 104 to the cache memory 108 is transferred at the maximum transfer rate of the removable storage device 104 so as to minimize the time the removable storage device 104 is powered on. Following data transfer to the cache memory 108, the computer program code 110 powers down the removable storage device 104 (step 207).

In step 208, the computer program code 110 initiates the transfer of the requested data from the cache memory 108 to the processor 106. The requested data is transferred at a rate required by the PDA 102 for data streaming (e.g., the rate required by a computer program executed by the processor 106, such as a computer program that plays digital audio or video or performs some other data intensive operation). The data transfer rate from the cache memory 108 to the processor 106 preferably is significantly lower than the data transfer rate from the removable storage device 104 to the cache memory 108. In this manner, the time the removable storage device 104 is powered on is reduced, and the battery life of the PDA 102 is increased.

In step 209, the processor 106 processes the data transferred thereto from the cache memory 108. In step 210, the computer program code 110 determines if the processor 106 requires additional data for processing (e.g., if the computer program the PDA 102 is executing requires more data) and if so, the process 200 returns to step 203 to request additional data; otherwise, the process 200 ends in step 211.

Figure 3:
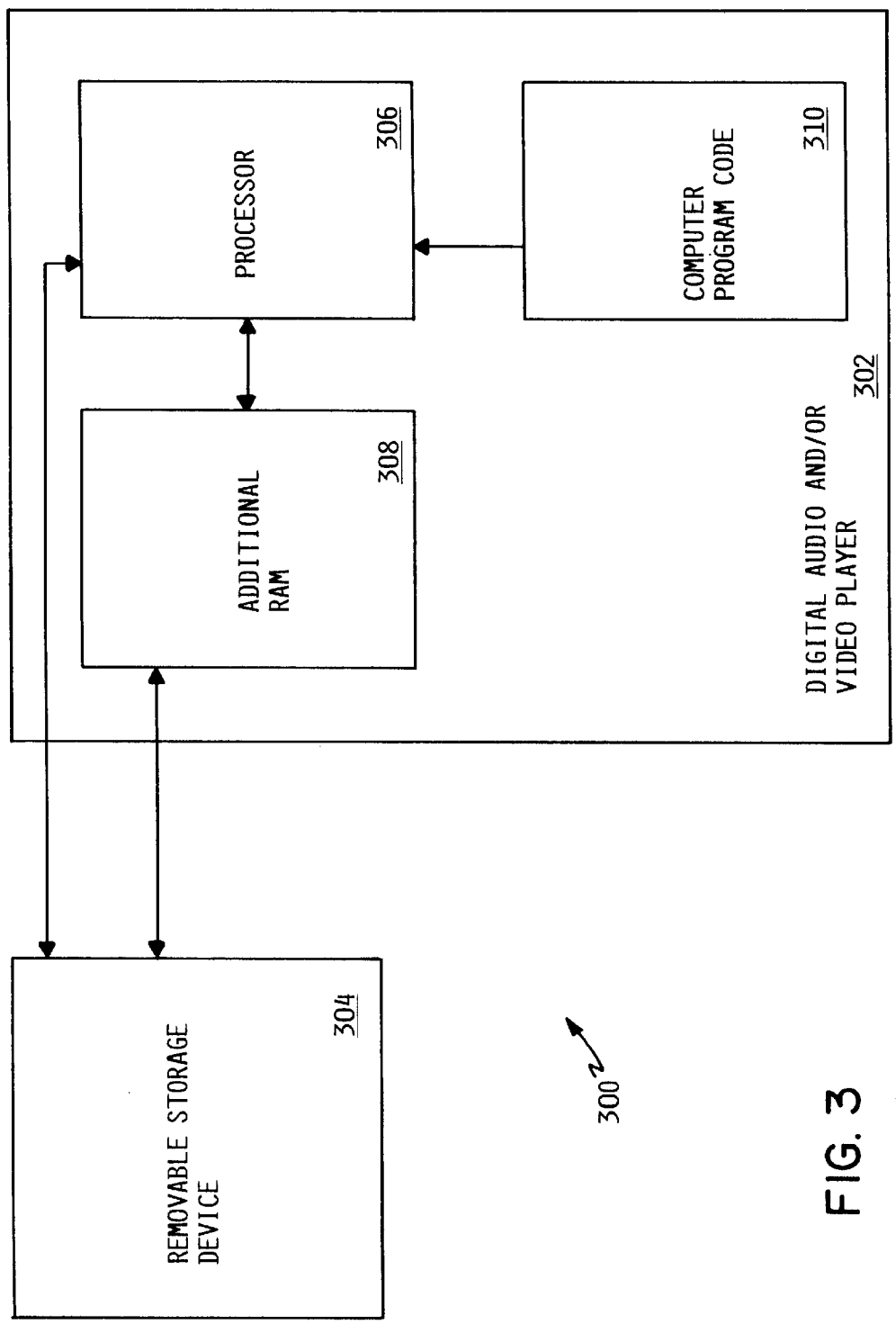
FIG. 3 is a schematic diagram of a second novel system for increasing the battery life of a portable electronic device such as a digital audio and/or video player.

FIG. 3 is a schematic diagram of a second novel system 300 for increasing the battery life of a portable electronic device such as a digital audio and/or video player 302. The second system 300 is similar to the first system 100 and comprises a removable storage device 304 coupled to the digital audio and/or video player 302. The removable storage device 304 may comprise, for example, a hard drive such as an IBM Microdrive, a flash memory device, a tape drive, a CD-ROM drive, a DVD drive or any other conventional storage device.

The digital audio and/or video player 302 includes a processor 306 coupled to a cache memory 308, and computer program code 310 for controlling the operation of the processor 306. The processor 306 may comprise, for example, any conventional microprocessor. Unlike the PDA 102 which preferably employs a portion of internal RAM for use as a cache memory, the cache memory 308 preferably is an additional memory device such as a RAM separate from the digital audio and/or video player 302's internal RAM (not shown), a first-in first-out buffer, a static memory, a dynamic memory, etc. The cache memory 308 should consume less power when powered on than the removable storage device 304 consumes when powered on.

The computer program code 310 includes program code that initiates a plurality of events within the digital audio and/or video player 302 or the removable storage device 304. Events initiated by the computer program code 310 preferably include:
1. a transfer of data at a first rate from the removable storage device 304 to the cache memory 308;
2. a transfer of data at a second rate which is lower than the first rate from the cache memory 308 to the processor 306; and
3. powering down the removable storage device 304 following the transfer of data from the removable storage device 304 to the cache memory 308.

Figure 4:
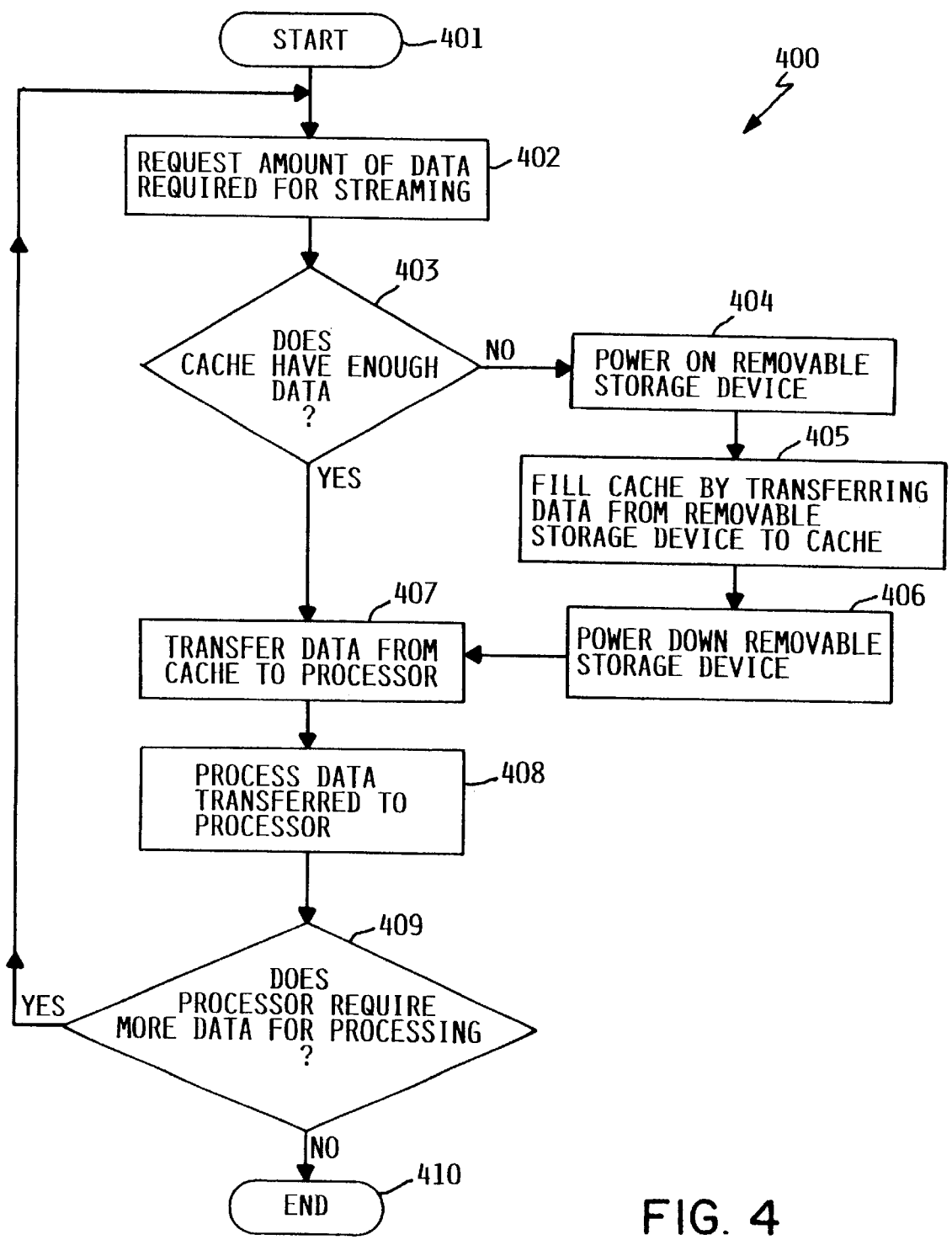
FIG. 4 is a flow chart of a preferred process for the second system of FIG. 3.

FIG. 4 is a flow chart of a preferred process 400 for the second system 300 of FIG. 3 that significantly increases the battery life of the digital audio and/or video player 302 when the digital audio and/or video player 302 plays digital audio and/or video. With reference to FIG. 4, the process 400 begins with step 401 when the digital audio and/or video player 302 runs the computer program code 310. In step 402, the processor 306 requests an amount of data that is required by the digital audio and/or video player 302 to play streaming digital audio and/or video.

In step 403, the computer program code 310 determines if the amount of unread data within the cache memory 308 has fallen below a predetermined threshold (e.g., whether there is enough unread data within the cache memory 308 to continue data streaming). A preferred predetermined threshold is about 10% unread data within the cache memory 308, or about five seconds before the cache memory 308 runs out of unread data (e.g., sufficient time for an IBM Microdrive to power on and transfer data to the cache memory 308). If the amount of unread data within the cache memory 308 is below the predetermined threshold, the process 400 proceeds with steps 404–406; otherwise the process 400 proceeds with step 407.

In step 405, the computer program code 310 powers on the removable storage device 304. Thereafter the computer program code 310 initiates the transfer of enough data from the removable storage device 304 to fill the cache memory 308 (step 405) and powers down the removable storage device 304 (step 406). Preferably all data transferred from the removable storage device 304 is transferred at the maximum transfer rate of the removable storage device 304 to minimize the;time the removable storage device 304 is powered on.

In step 407, the computer program code 310 initiates the transfer of the requested data from the cache memory 308 to the processor 306 at a rate required by the processor 306 to play digital audio and/or video. The data transfer rate from the cache memory 308 to the processor 306 preferably is significantly lower than the data transfer rate from the removable storage device 304 to the cache memory 308. In this manner, the time the removable storage device 304 is powered on is reduced, and the battery life of the digital audio and/or video player 302 is increased.

In step 408, the processor 306 processes the data transferred thereto from the cache memory 308. In step 409, the computer program code 310 determines it the processor 306 requires additional data for processing (e.g., if the digital audio and/or video player 302 is still playing digital audio or video), and if so, the process 400 returns to step 402 to request additional data; otherwise, the process 400 ends in step 410.

Figure 5:
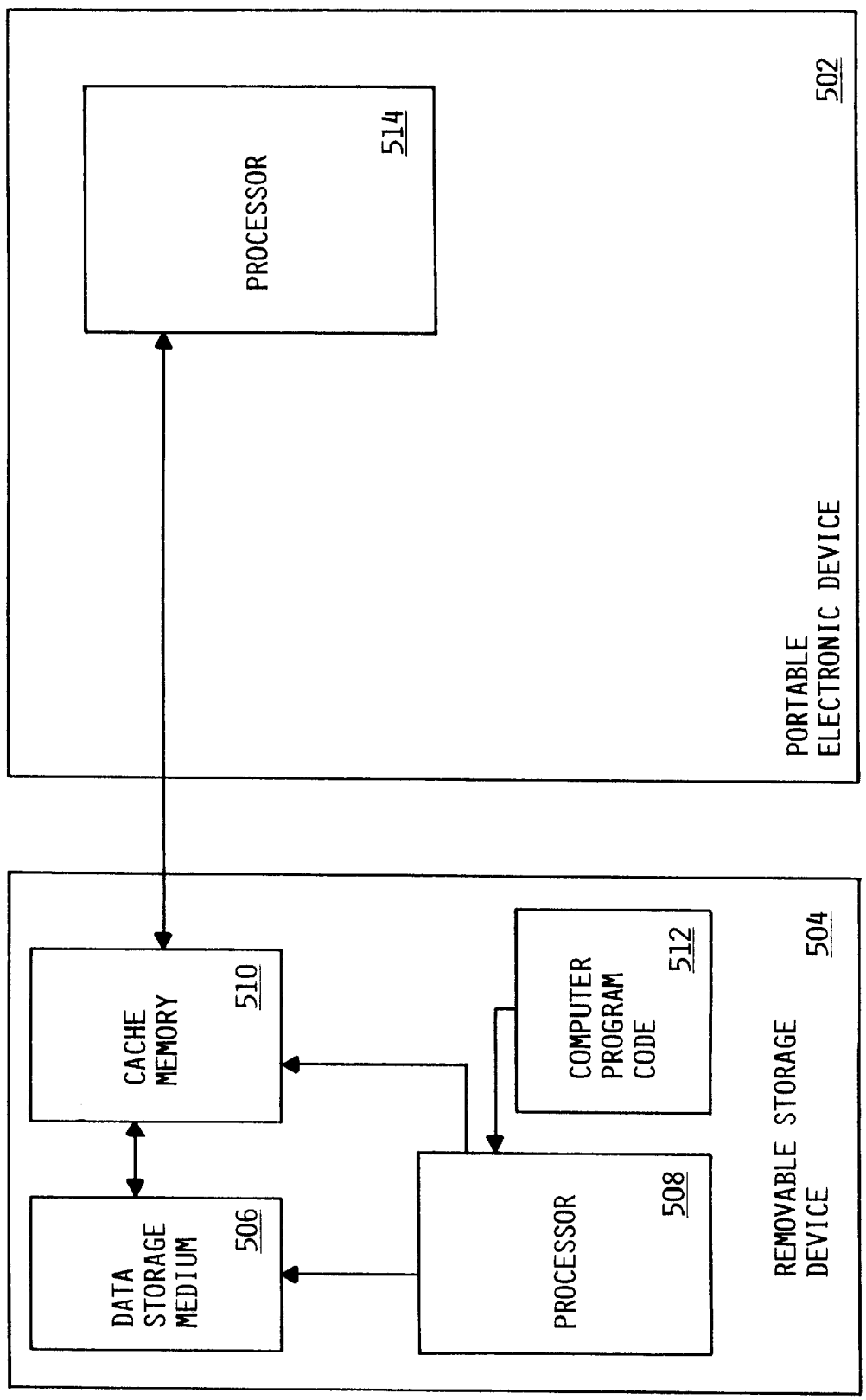
FIG. 5 is a schematic diagram of a third novel system for increasing the battery life of a portable electronic device.

FIG. 5 is a schematic diagram of a third novel system 500 for increasing the battery life of a portable electronic device 502 (e.g., a PDA, a digital audio and/or video player, etc.). The third system 500 is similar to the first system 100 and the second system 300. However, unlike the first system 100 and the second system 300, the third system 500 employs a read ahead cache within a removable storage device rather than within a portable electronic device.

With reference to FIG. 5, the third system 500 comprises a removable storage device 504 coupled to the portable electronic device 502. The removable storage device 504 includes a conventional data storage medium 506 such as a hard drive, a flash memory device, a tape drive, a CD-ROM drive, a DVD drive or any other conventional storage device. Additionally, the removable storage device 504 includes a processor 508 coupled to the data storage medium 506 and to a cache memory 510, and computer program code 512 for controlling the operation of the processor 508. The processor 503 may comprise, for example, any conventional microprocessor. The cache memory 510 preferably is a low power memory device such as an internal RAM, a first-in first-out buffer, a static memory, a dynamic memory, etc. The cache memory 510 should consume less power when powered on than the data storage medium 506 consumes when powered on. The portable electronic device 502 includes its own processor 514.

The third system 500 operates similar to the process 200 or the process 400 previously described, with the exceptions that step 202 is not required and only the data storage medium 506 of the removable storage device 504 is powered on and powered down in steps 205/404 and 207/406, respectively. Further, the processor referred to in steps 208–210 or in steps 407–409 is the processor 514 of the portable electronic device 502, not the removable storage device 504's processor 508.

The foregoing description discloses only the preferred embodiments of the invention, modifications of the above disclosed apparatus and method which fall within the scope of the invention will be readily apparent to those of ordinary skill in the art. For instance, the particular portable electronic devices, removable storage devices and cache memories described herein are merely exemplary, and any other devices/memories may be similarly employed. Further, each of the computer program code 110, the computer program code 310 and the computer program code 510 may comprise a computer program product.

Accordingly, while the present invention has been disclosed in connection with the preferred embodiments thereof, it should be understood that other embodiments may fall within the spirit and scope of the invention, as defined by the following claims.

What is claimed is:

1. A system adapted to increase the battery life of a portable electronic device when the portable electronic device employs a disk storage device, the system comprising:
    a disk storage device adapted to store data and to transfer data, the disk storage device capable of transferring data at a first rate;
    a portable electronic device coupled to the disk storage device, the portable electronic device having:
        a processor adapted to execute a computer program that requires data to be transferred to the processor at a second rate which is lower than the first rate;
        a cache memory adapted to receive data from the disk storage device and to transfer data to the processor; and
        computer program code adapted to:
            initiate a transfer of data at the first rate from the disk storage device to the cache memory;
            initiate a transfer of data at the second rate from the cache memory to the processor; and
            following the transfer of data from the disk storage device to the cache memory, power down the disk storage device to an idle state wherein a disk of the disk storage device is stationary while power is still applied to the disk storage device.

2. The system of claim 1 wherein the disk storage device is capable of powering on, transferring about a minute of digital audio data to the cache memory and powering down all within about 3 seconds or less.

3. The system of claim 1 wherein the portable electronic device comprises a personal data assistant.

4. The system of claim 1 wherein the portable electronic device comprises a device adapted to play compressed audio data.

5. The system of claim 1 wherein the cache memory comprises a memory selected from the group consisting of a first-in first-out buffer, a random access memory, a static memory and a dynamic memory.

6. A method of transferring data between a disk storage device and a second device comprising:
    providing a disk storage device for storing data and for transferring data, the disk storage device capable of transferring data at a first rate;
    providing a second device, the second device requiring data at a second rate which is lower than the first rate;
    transferring data at the first rate from the disk storage device to an intermediate storage location;
    powering down the disk storage device to an idle state wherein a disk of the disk storage device is stationary while power is still applied to the disk storage device; and
    transferring data at the second rate from the intermediate storage location to the second device.

7. The method of claim 6 wherein the disk storage device is capable of being powered on, transferring about a minute of digital audio data to the intermediate storage location and powering down all within about 3 seconds or less.

* * * * *